(12) United States Patent
Jung et al.

(10) Patent No.: US 10,057,729 B2
(45) Date of Patent: *Aug. 21, 2018

(54) APPARATUS AND METHOD FOR TRANSMITTING/RECEIVING MULTIUSER PACKET IN A MOBILE COMMUNICATION SYSTEM

(71) Applicant: Samsung Electronics Co., Ltd., Suwon-si, Gyeonggi-do (KR)

(72) Inventors: Jung-Soo Jung, Seongnam-si (KR); Beom-Sik Bae, Suwon-si (KR); Dae-Gyun Kim, Seongnam-si (KR); Yu-Chul Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 74 days.

This patent is subject to a terminal disclaimer.

(21) Appl. No.: 14/325,276

(22) Filed: Jul. 7, 2014

(65) Prior Publication Data
US 2014/0307615 A1   Oct. 16, 2014

Related U.S. Application Data

(63) Continuation of application No. 11/327,472, filed on Jan. 9, 2006, now Pat. No. 8,842,695.

(30) Foreign Application Priority Data

Jan. 7, 2005   (KR) ........................ 10-2005-0001893
Sep. 20, 2005   (KR) ........................ 10-2005-0087443

(51) Int. Cl.
*H04L 12/413*   (2006.01)
*H04W 4/06*   (2009.01)
(Continued)

(52) U.S. Cl.
CPC ............. *H04W 4/06* (2013.01); *H04W 28/06* (2013.01); *H04Q 11/0478* (2013.01)

(58) Field of Classification Search
CPC .......................... H04Q 11/0478; H04W 28/06
(Continued)

(56) References Cited

U.S. PATENT DOCUMENTS 5,544,161 A   8/1996   Bigham et al.
6,442,170 B1   8/2002   Perlman et al.
(Continued)

FOREIGN PATENT DOCUMENTS

EP   0 993 148 A2   7/1999
EP   1 003 302 A2   5/2000
(Continued)

OTHER PUBLICATIONS

Attar, Rashid; Bhushan, Naga; Enhanced Forward Traffic Channel MAC Protocol; Sep. 16, 2003, Qualcomm, pp. 1-28.*
(Continued)

*Primary Examiner* — Christopher D Crompton
(74) *Attorney, Agent, or Firm* — Jefferson IP Law, LLP

(57) ABSTRACT

An apparatus and method is provided for generating one packet with transmission data and transmitting the packet from an access network transceiver system (ANTS) to a plurality of access terminals (ATs) in a mobile communication system including the ATs and the ANTS which are capable of performing packet data communication with ATs located in coverage thereof. The method includes the steps of generating a medium access control (MAC) header including information on a receiving AT's address, a length and format for transmission data, generating a MAC payload, by consecutively connecting data units to be transmitted to the receiving AT, and generating a MAC trailer. The ANTS pads '0' bits to the MAC header if a predetermined (Continued)

MAC size is greater than a sum of lengths of the MAC header, the MAC payload and the MAC trailer.

8 Claims, 15 Drawing Sheets

(51) Int. Cl.
*H04W 28/06* (2009.01)
*H04Q 11/04* (2006.01)

(58) Field of Classification Search
USPC .................................................. 370/473, 474
See application file for complete search history.

(56) References Cited

U.S. PATENT DOCUMENTS

| | | | |
|---|---|---|---|
| 7,362,751 | B2 | 4/2008 | Khacherian et al. |
| 7,379,422 | B2 | 5/2008 | Nation |
| 7,706,363 | B1 | 4/2010 | Daniel et al. |
| 2002/0193110 | A1 | 12/2002 | Julka et al. |
| 2003/0091045 | A1 | 5/2003 | Choi et al. |
| 2004/0146158 | A1 | 7/2004 | Park |
| 2004/0160984 | A1* | 8/2004 | Sidhushayana et al. ..... 370/474 |
| 2004/0193876 | A1 | 9/2004 | Donley et al. |
| 2004/0214574 | A1 | 10/2004 | Eyuboglu et al. |
| 2004/0218587 | A1 | 11/2004 | Kim et al. |
| 2004/0258081 | A1 | 12/2004 | Hayashi |
| 2005/0163064 | A1 | 7/2005 | Choi et al. |
| 2005/0266847 | A1 | 12/2005 | Tinnakornsrisuphap et al. |
| 2006/0153126 | A1 | 7/2006 | Jung et al. |
| 2007/0277077 | A1 | 11/2007 | Vesma et al. |
| 2010/0046518 | A1 | 2/2010 | Takagi et al. |

FOREIGN PATENT DOCUMENTS

| | | |
|---|---|---|
| JP | 2004-328570 | 11/2004 |
| KR | 19980055668 | 9/1998 |
| KR | 19980061568 | 10/1998 |
| KR | 19990061352 | 7/1999 |
| KR | 20040097489 | 11/2004 |
| RU | 2 204 220 C2 | 5/2003 |
| WO | WO01/91497 | 11/2001 |
| WO | WO 03/039076 A1 | 5/2003 |
| WO | WO2004/075495 | 9/2004 |
| WO | WO2004/112324 | 12/2004 |

OTHER PUBLICATIONS

Naga Bhushan et al., "Detailed Description for QUALCOMM's FL Proposal for HRPD Rev. A Enhancement", 3RD Generation Partnership Project 2, "3GPP2", Oct. 14, 2003, pp. 1-9, QUALCOMM Incorporated.

European Telecommunications Standards Institute, "Digital Cellular Telecommunications System (Phase 2+)", 3GPP TS 44.060 Version 5.6.0 Release 5). Mar. 2003, pp. 1 and 333-335.

"CDMA2000 High Rate Packet Data Air interface Specification", 3RD Generation Partnership Project 2, 3GPP2, Oct. 25, 2002, pp. 8-1 through 8-69.

* cited by examiner

APPARATUS AND METHOD FOR TRANSMITTING/RECEIVING MULTIUSER PACKET IN A MOBILE COMMUNICATION SYSTEM

CROSS-REFERENCE TO RELATED APPLICATIONS

This application is a continuation of a U.S. patent application of Jung Soo Jung et al. entitled "Apparatus and Method for Transmitting/Receiving Multiuser Packet in a Mobile Communication System", Ser. No. 11/327,472, filed Jan. 9, 2006, which claims the benefit under 35 U.S.C. § 119(a) of Korean Patent Application No. 10-2005-0001893 entitled "Apparatus and Method for Transmitting/Receiving Multiuser Packet in a Mobile Communication System" filed in the Korean Intellectual Property Office on Jan. 7, 2005, and Korean Patent Application No. 10-2005-0087443 entitled "Apparatus and Method for Transmitting/Receiving Multiuser Packet in a Mobile Communication System" filed in the Korean Intellectual Property Office on Sep. 20, 2005, the entire disclosures of each of said applications are hereby incorporated by reference.

BACKGROUND OF THE INVENTION

Field of the Invention

The present invention relates generally to an apparatus and method for transmitting/receiving data in a mobile communication system. In particular, the present invention relates to an apparatus and method for transmitting/receiving packet data in a mobile communication system.

Description of the Related Art

Mobile communication systems have been developed to provide voice services, guaranteeing the mobility of a user. With the rapid progress in communication technology, mobile communication systems have evolved into systems that are capable of providing data service as well. Recently, research has been conducted on high-speed data transmission in a Code Division Multiple Access (CDMA) mobile communication system. A 1x Evolution Data Only (1xEVDO) system is a typical mobile communication system having a channel structure for the high-speed data transmission. The 1xEVDO system was proposed in the $3^{rd}$ Generation Partnership Project 2 (3GPP2) to complement data communication of the IS-2000 system.

In the 1xEVDO system, data communication can be divided into forward data communication and reverse data communication. The term "forward data communication" refers to data communication from an access network (or base station) to an access terminal (or mobile station), while the term "reverse data communication" refers to data communication from an access terminal to an access network. A description will now be made of exemplary structures of forward channels in the 1xEVDO system. The forward channels are classified as a pilot channel, a forward. Medium Access Control (MAC) channel, a forward traffic channel, and a forward control channel, all of which are transmitted to an access terminal after being subjected to Time Division Multiplexing (TDM). A set of the TDM transmission signals is called a "burst."

Among these channels, the forward traffic channel transmits a user data packet, and the forward control channel transmits a control message and a user data packet. In addition, the forward MAC channel is used for reverse rate control, transmission of power control information, and assignment of forward data channel.

A description will now be made of reverse channels used in the 1xEVDO system. Unlike the forward channels, the reverse channels used in the 1xEVDO system have different identification codes unique to access terminals. Therefore, in the following description, the "reverse channels" refer to channels transmitted to an access network with different identification codes unique to the access terminals. The reverse channels comprise a pilot channel, a reverse traffic channel, an access channel, a Data Rate Control (DRC) channel, and a Reverse Rate Indicator (RRI) channel.

Functions of the reverse channels will now be described in greater detail. The reverse traffic channel, like the forward traffic channel, transmits a user data packet in the reverse direction. The DRC channel is used to indicate a forward data rate that the access terminal can support, and the RRI channel is used to indicate a rate of a data channel transmitted in the reverse direction. The access channel is used when the access terminal transmits a message or traffic to the access network before the traffic channel is connected. With reference to FIG. 1, a description will now be made of a configuration of the 1xEVDO system, a rate control operation, and its associated channels.

FIG. 1 is a conceptual diagram illustrating a 1xEVDO mobile communication system.

Referring to FIG. 1, reference numeral 100 denotes access terminals (ATs), reference numeral 110 denotes access network transceiver systems (ANTSs), and reference numeral 120 denotes access network controllers (ANCs). A brief description of the system configuration will now be made. A first ANTS 110a communicates with a plurality of ATs 100a and 100b, and a second ANTS 110b communicates with an AT 100c. The first ANTS 110a is connected to a first ANC 120a, and the second ANTS 110b is connected to a second ANC 1201. Each of the ANCs 120a and 120b can be connected to two or more ANTSs. In FIG. 1, one ANC is connected to only one ANTS, as an example. The ANCs 120a and 120b are connected to a packet data service node (PDSN) 130 that provides a packet data service, and the PDSN 130 is connected to an Internet network 140.

In the exemplary mobile communication system of FIG. 1, each of the ANTSs 110a and 110b transmits packet data to only the AT having the highest packet data rate among the ATs located in its coverage. A detailed description thereof will now be made. In the following description, an AT will be denoted by reference numeral 100, and an ANTS will be denoted by reference numeral 110.

For rate control of a forward channel, an AT 100 measures reception strength of a pilot channel transmitted by an ANTS 110, and determines a forward data rate desired by the AT 100 according to a fixed value predetermined based on the measured pilot reception strength. Thereafter, the AT 100 transmits DRC information corresponding to the determined forward data rate to the ANTS 110 over a DRC channel. Then the ANTS 110 receives DRC information from all of the ATs intending to communicate therewith, located in its coverage. Based on the DRC information, the ANTS 110 can transmit packet data to only a particular AT having a good channel quality condition at a data rate reported by the AT. The DRC information refers to a value determined from a possible forward data rate calculated by the AT by measuring its channel condition. Although a mapping relationship between the forward channel condition and the DRC information is subject to change according to implementation, typically the mapping relationship is fixed in the manufacturing process of the AT.

The mapping relationship between the DRC value reported by an AT and its associated data rate and transmission format is shown in Table 1 below, by way of example.

TABLE 1

| DRC | Data Rate (kbps) | Number of TX (slots) | Transmission Format |
| --- | --- | --- | --- |
| 0x0 | 0 | 16 | (1024, 16, 1024) |
| 0x1 | 38.4 | 16 | (1024, 16, 1024) |
| 0x2 | 76.8 | 8 | (1024, 8, 512) |
| 0x3 | 153.6 | 4 | (1024, 4, 256) |
| 0x4 | 307.2 | 2 | (1024, 2, 128) |
| 0x5 | 307.2 | 4 | (2048, 4, 128) |
| 0x6 | 614.4 | 1 | (1024, 1, 64) |
| 0x7 | 614.4 | 2 | (2048, 2, 64) |
| 0x8 | 921.6 | 2 | (3072, 2, 64) |
| 0x9 | 1228.8 | 1 | (2048, 1, 64) |
| 0xa | 1228.8 | 2 | (4096, 2, 64) |
| 0xb | 1843.2 | 1 | (3072, 1, 64) |
| 0xc | 2457.6 | 1 | (4096, 1, 64) |
| 0xd | 1536 | 2 | (5120, 2, 64) |
| 0xe | 3072 | 1 | (5120, 1, 64) |

It can be noted from Table 1 that the transmission format is expressed in the form of (A, B, C). The transmission format will be described herein below with reference to a first field of Table 1, as an example. In the transmission format (A, B, C), C=1024 indicates 1024-bit information, B=16 indicates that the information is transmitted for 16 slots, and A=1024 indicates that a 1024-chip preamble is transmitted. Therefore, an ANTS transmits data to an AT with the transmission format corresponding to a DRC value reported by the AT. After reporting the DRC value, the AT attempts to receive a forward data channel only with the transmission format corresponding to the reported DRC value. This agreement is made because no other channel exists to indicate a data rate for a data channel transmitted in the forward direction. That is, when the ANTS transmits data using a transmission format other than the transmission format reported by the AT, there is no way to indicate the transmission format, so that the AT cannot receive the data. Therefore, the ANTS transmits data only with the transmission format corresponding to (compatible with) the DRC reported by the AT. For example, for an AT that transmitted DRC=0x01 over a DRC channel, the ANTS transmits data using a transmission format (1024, 16, 1024) corresponding to the DRC value, and the AT attempts to receive the data with only the transmission format of the corresponding DRC value.

The packet data that the ANTS transmits to one AT according to received DRC information in accordance with the method of Table 1 is called a "single user packet." The ANTS transmits data using the single user packet for the general data service. Compared with the general data service, such a data service as voice-over-Internet protocol (VoIP) requires a lower transmission bandwidth of about 9.6 kbps, in which, data of about 192 bits is transmitted every 20 ms. However, transmitting the short data through the single user packet having a minimum size of 1024 bits causes unnecessary bandwidth waste. In order to prevent the resource waste in the wireless access section, a scheme for transmitting data for several users through one physical packet has been introduced, and this packet format is called a "multiuser packet." The multiuser packet will now be described with reference to Table 2 below, by way of example.

TABLE 2

| DRC | Rate (kbps) | List of Associated Multi-User Transmission Formats |
| --- | --- | --- |
| 0x0 | 0 | (128, 4, 256), (256, 4, 256), (512, 4, 256), (1024, 4, 256) |
| 0x1 | 38.4 | (128, 4, 256), (256, 4, 256), (512, 4, 256), (1024, 4, 256) |
| 0x2 | 76.8 | (128, 4, 256), (256, 4, 256), (512, 4, 256), (1024, 4, 256) |
| 0x3 | 153.6 | (128, 4, 256), (256, 4, 256), (512, 4, 256), (1024, 4, 256) |
| 0x4 | 307.2 | (128, 4, 256), (256, 4, 256), (512, 4, 256), (1024, 4, 256) |
| 0x5 | 307.2 | (128, 4, 256), (256, 4, 256), (512, 4, 256), (1024, 4, 256), (2048, 4, 128) |
| 0x6 | 614.4 | (128, 4, 256), (256, 4, 256), (512, 4, 256), (1024, 4, 256) |
| 0x7 | 614.4 | (128, 4, 256), (256, 4, 256), (512, 4, 256), (1024, 4, 256), (2048, 4, 128) |
| 0x8 | 921.6 | (128, 4, 256), (256, 4, 256), (512, 4, 256), (1024, 4, 256), (2048, 4, 128), (3072, 2, 64) |
| 0x9 | 1228.8 | (128, 4, 256), (256, 4, 256), (512, 4, 256), (1024, 4, 256), (2048, 4, 128) |
| 0xa | 1228.8 | (128, 4, 256), (256, 4, 256), (512, 4, 256), (1024, 4, 256), (2048, 4, 128), (3072, 2, 64), (4096, 2, 64) |
| 0xb | 1843.2 | (128, 4, 256), (256, 4, 256), (512, 4, 256), (1024, 4, 256), (2048, 4, 128), (3072, 2, 64) |
| 0xc | 2457.6 | (128, 4, 256), (256, 4, 256), (512, 4, 256), (1024, 4, 256), (2048, 4, 128), (3072, 2, 64), (4096, 2, 64) |
| 0xd | 1536 | (128, 4, 256), (256, 4, 256), (512, 4, 256), (1024, 4, 256), (2048, 4, 128), (3072, 2, 64), (4096, 2, 64), (5120, 2, 64) |
| 0xe | 3072 | (128, 4, 256), (256, 4, 256), (512, 4, 256), (1024, 4, 256), (2048, 4, 128), (3072, 2, 64), (4096, 2, 64), (5120, 2, 64) |

Table 2 illustrates an exemplary format of the multiuser packet for each DRC in the 1xEVDO system. In Table 2, each DRC index includes its associated data rate and a format of a packet to be transmitted to multiple users. A description thereof will be made with reference to a fifth field of Table 2, as an example. That is a format of a multiuser packet transmitted to multiple ATs that transmitted DRC=5 is given as (128, 4, 256), (256, 4, 256), (512, 4, 256), (1024, 4, 256), (2048, 4, 128). This multiuser packet includes packet data for several users, and is transmitted together with the addresses of the ATs that will receive the packet data. An AT, upon receiving the multiuser packet, determines whether its own address is included in the received multiuser packet, and if its own address is included therein, processes a user packet corresponding thereto.

Although transmission of the multiuser packet is being discussed in 3GPP2 that has established the CDMA 1xEVDO standard, there is no discussion on how to transmit an address of the multiuser packet. Accordingly, there is a need for an apparatus and method that is capable of detecting the case where one packet is commonly transmitted to multiple users rather than a single user, and reporting the detection result to each of the users.

SUMMARY OF THE INVENTION

An object of the present invention is to substantially solve the above and other problems, and provide an apparatus and method for designating users during transmission/reception of a multiuser packet in a mobile communication system.

Another object of the present invention is to provide an apparatus and method for detecting transmission of a packet including mixed data for multiple users and reporting the detection result in a mobile communication system.

Another object of the present invention, is to provide an apparatus and method that is capable of receiving and processing a packet including mixed data for multiple users in a mobile communication system.

According to one aspect of the present invention, a method is provided for generating one packet with transmission data and transmitting the packet from an access network transceiver system (ANTS) to a plurality of access terminals (ATs) in a mobile communication system including the ATs and the ANTS which are capable of performing packet data communication with ATs located in coverage thereof. The method comprises the steps of generating a medium access control (MAC) header including information on a receiving AT's address, and a length and format for transmission data, generating a MAC payload by consecutively connecting data units to be transmitted to the receiving AT, and generating a MAC trailer, wherein '0' bits are padded to the MAC header if a predetermined MAC size is greater than a sum of lengths of the MAC header, the MAC payload and the MAC trailer.

According to another aspect of the present invention, a method is provided for receiving a multiuser packet in a mobile communication system including access terminals (ATs) and an access network transceiver system (ANTS) that performs packet communication with ATs located in coverage thereof, and generates the multiuser packet with transmission data to be transmitted to two or more ATs. The method comprises the steps of receiving the multiuser packet from the ANTS, wherein the multiuser packet comprises a medium access control (MAC) header including information on each AT's address and a length and format for the transmission data, a MAC payload generated by consecutively connecting data units to be transmitted to each AT, and a MAC trailer, wherein '0' bits are padded to the MAC header if a predetermined MAC size is greater than a sum of lengths of the MAC header, the MAC payload and the MAC trailer. The method further comprises the steps of determining whether address information of the AT is included in the MAC header of the received multiuser packet, and extracting data indicated by the MAC header from the MAC payload of the multiuser packet if the address information of the AT is included in the MAC header.

According to another aspect of the present invention, an apparatus for generating one packet with transmission data and transmitting the packet from an access network transceiver system (ANTS) to a plurality of access terminals (ATs) in a mobile communication system including the AT's and the ANTS which are capable of performing packet data communication with ATs located in coverage thereof. The apparatus comprises data queues for storing data to be transmitted to each of the ATs, a controller for performing a control operation of generating a medium access control (MAC) header including information on a receiving AT's address, a length and format for transmission data, generating a MAC trailer, and generating a MAC payload by consecutively connecting data units to be transmitted to the receiving AT, and performing a control operation of padding '0' bits to the MAC header if a predetermined MAC size is greater than a sum of lengths of the MAC header, the MAC payload and the MAC trailer. The apparatus further comprises a data generation and transmission/reception unit for, under the control of the controller, combining the data stored in the data queues and information output from the controller, and transmitting the combined. result to the ATs.

According to yet another aspect of the present invention, an apparatus is provided for receiving a multiuser packet in a mobile communication system including access terminals (ATs) and an access network transceiver system (ANTS) that performs packet communication with ATs located in coverage thereof, and generates the multiuser packet with transmission data to be transmitted to two or more ATs. The apparatus comprises a reception data processor for receiving the multiuser packet from the ANTS, wherein the multiuser packet comprises a medium access control (MAC) header including information on each AT's address and a length and format for the transmission data, a MAC payload generated by consecutively connecting data units to be transmitted to each AT, and a MAC trailer, wherein '0' bits are padded to the MAC header if a predetermined MAC size is greater than a sum of lengths of the MAC header, the MAC payload and the MAC trailer, and for demodulating and decoding the received multiuser packet. The apparatus further comprises a controller for determining whether address information of the AT is included in the MAC header of the received multiuser packet, and extracting data indicated by the MAC header from the MAC payload of the multiuser packet if the address information of the AT is included in the MAC header.

BRIEF DESCRIPTION OF THE DRAWINGS

The above and other objects, features and advantages of the present invention will become more apparent from the following detailed description when taken in conjunction with the accompanying drawings, in which.

Throughout the drawings, like reference numerals will be understood to refer to like parts, components and structures.

DETAILED DESCRIPTION OF EXEMPLARY EMBODIMENTS

Exemplary embodiments of the present invention will now be described in greater detail with reference to the accompanying drawings. In the following description, a detailed description of known functions and configurations incorporated herein will be omitted for clarity and conciseness.

In the following description, exemplary embodiments of the present invention disclose an efficient format of a multiuser packet, the format comprising information on an address of an access terminal (AT) scheduled to receive the multiuser packet and information on a length and configuration of the packet. The following description of the present invention will provide three exemplary embodiments, but is not limited thereto.

First Embodiment

Figure 2A:
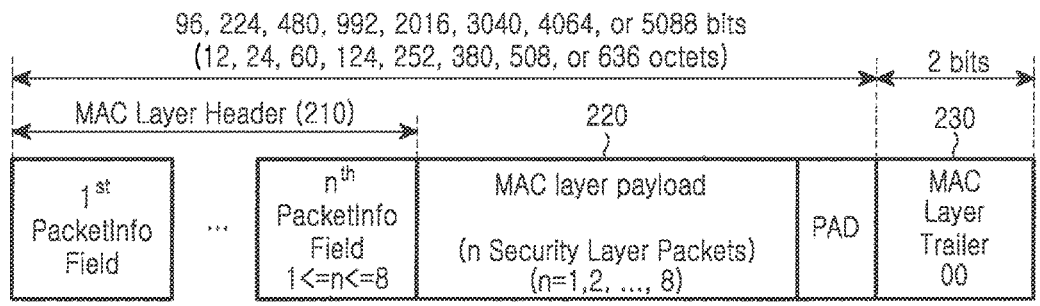
FIG. 2A is a diagram illustrating an efficient format of a multiuser packet according to a first embodiment of the present invention

FIG. 2A is a diagram illustrating an efficient format of a multiuser packet according to a first embodiment of the present invention. With reference to FIG. 2A, a detailed description will now be made of an efficient format of a multiuser packet according to a first embodiment of the present invention.

A multi-user packet shown in FIG. 2A is roughly divided into three parts, comprising:

(1) Medium Access Control (MAC) header 210,
(2) MAC payload 220, and
(3) MAC trailer 230.

The MAC header 210, a part including information on addresses, lengths and formats of several user packets included in a MAC packet, comprises a minimum of one PacketInfo field or a maximum of 8 PacketInfo fields. Although the number of the PacketInfo fields is extendable, the preferred maximum number of the PacketInfo fields becomes 8 when a size of a packet provided in the 1xEVDO system is taken into consideration. Therefore, the minimum number and maximum number of the PacketInfo fields are subject to change for other systems. The PacketInfo field in the MAC header 210 can have a format as shown in FIG. 2B or a format as shown in FIG. 2C.

Figure 2B:
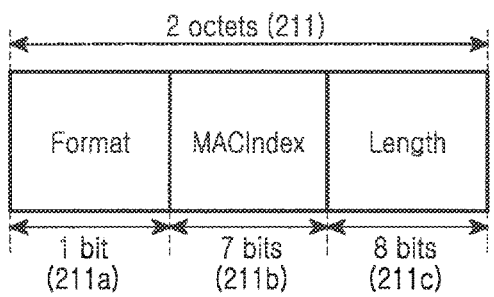
FIGS. 2B and 2C are diagrams illustrating different formats of a PacketInfo field in a MAC header of a multiuser packet according to the first embodiment of the present invention.
Figure 2C:
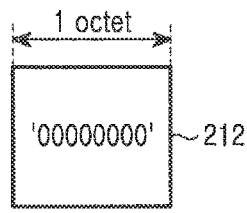

FIGS. 2B and 2C are diagrams illustrating different formats of a PacketInfo field in a MAC header of a multiuser packet according to the first embodiment of the present invention. Referring to FIG. 2B, a PacketInfo field 211 with a 2-octet length comprises a 1-bit Format field 211a indicating format information of the MAC packet, a 7-bit MACIndex field 211b indicating a receiving AT of the MAC packet, and an 8-bit Length field 211c indicating a length of the MAC packet. That is, the 8 most significant bits (MSB) of the 2-octet PacketInfo field cannot have a value of '00000000'. Referring to FIG. 2C, a NULL PacketInfo field 212 with a 1-octet length has all zero values '00000000' over the 1 octet. Because the 8 MSB bits of the former field 211 cannot have a value of '00000000', a receiving AT can distinguish a format of the former field 211 from a format of the latter field 212. The NULL PacketInfo field 212 is used to distinguish the MAC header 210 from the MAC payload 220 in the MAC packet. The NULL PacketInfo field 212 is added to an end of the MAC header 210 when the number of user packets included in the MAC packet is less than 8 and the user packets cannot fully fill the MAC payload 220.

The MAC payload 220 comprises actual user packets included in the MAC packet. The MAC payload 220 is generated by consecutively connecting packets for multiple users such that a user security layer packet (hereinafter referred to as a "user packet" for simplicity) corresponding to information on an PacketInfo field of the MAC header 210 is located in an $i^{th}$ point of the MAC payload 220.

The MAC trailer 230 comprises information indicating a format of the MAC packet, and has a value of '00' for a format of a multiuser packet.

Figure 3A:
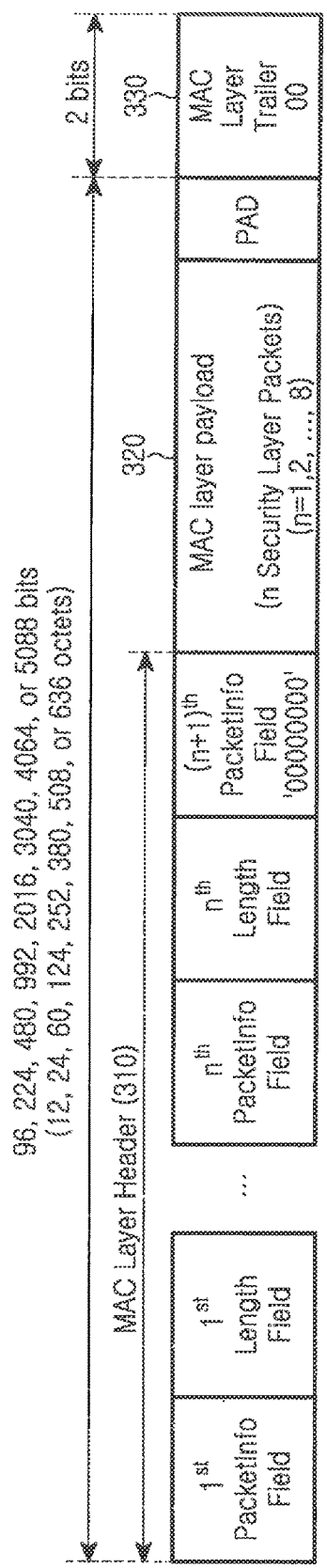
FIG. 3A is a diagram illustrating a modified format of a multiuser packet according to the first embodiment of the present invention.

FIG. 3A is a diagram illustrating a modified format of a multiuser packet according to the first embodiment of the present invention. With reference to FIG. 3A, a detailed description will now be made of a modified format of a multiuser packet according to the first embodiment of the present invention.

The overall format of FIG. 3A is substantially equal to the format of FIG. 2A. Similarly, the multiuser packet shown in FIG. 3A is roughly divided into three parts comprising a MAC header 310, a MAC payload 320 and a MAC trailer 330.

Figure 3B:
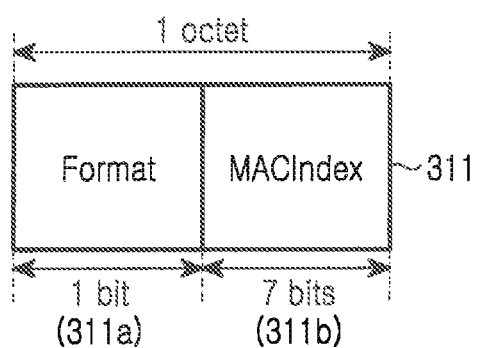
FIG. 3B is a diagram illustrating a format of PacketInfo field in a modified MAC header for a multiuser packet according to the first embodiment of the present invention.

Compared with the MAC header 210 having the PacketInfo field 211 generated by consecutively connecting the Format field 211a indicating format information of a user packet, the MACIndex field 211b indicating a user identifier (ID), and the Length field 211c indicating a length of the user packet, the MAC header 310 as shown in FIG. 3B comprises a PacketInfo field 311 generated by connecting a Format field 311a and a MACIndex field 311b, without including the Length field 211c. Similarly, a NULL PacketInfo field in the format of FIG. 3A is used for distinguishing the MAC header 310 from the MAC payload 320 in the MAC packet. The NULL PacketInfo field is added to an end of the MAC header 310 when the number of user packets included in the MAC packet is less than 8 and the user packets cannot fully fill the MAC payload 320. Therefore, the PacketInfo field 311 of FIG. 3B has a one-octet length, and includes the 1-bit Format field 311a and the 7-bit MACIndex field 311b.

Figure 4:
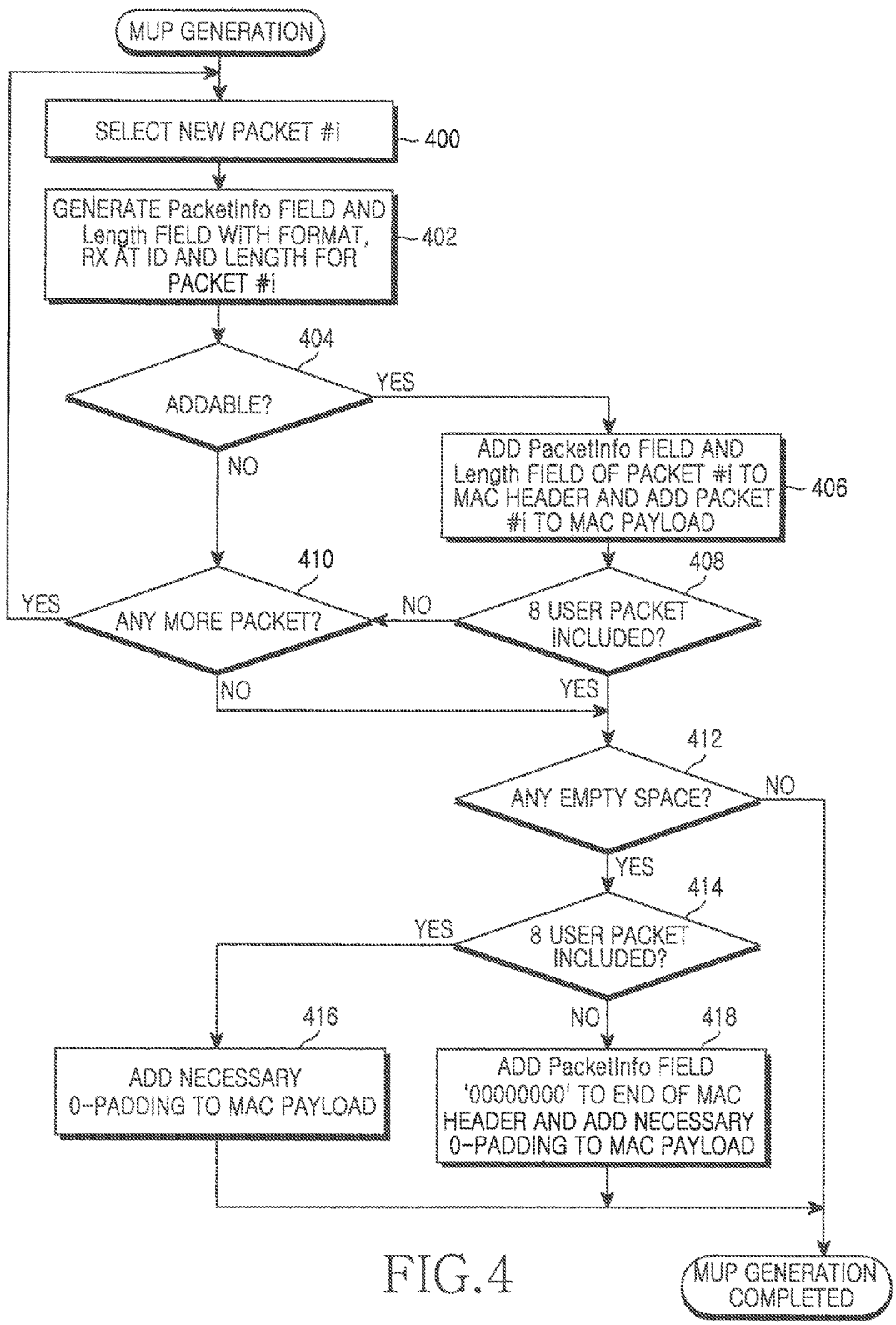
FIG. 4 is a flowchart illustrating a process of generating a multiuser packet in an ANTS according to the first embodiment of the present invention.

FIG. 4 is a flowchart illustrating a process of generating a multiuser packet (MUP) in an access network transceiver system (ANTS) according to the first embodiment of the present invention. With reference to FIG. 4, a detailed description will now be made of a process of generating a multiuser packet in an ANTS according to the first embodiment of the present invention. It should be noted that the process of FIG. 4 can be applied to either the basic format or the modified format. In the following description, FIGS. 2A through 2C will be referred to as FIG. 2, and FIGS. 3A and 3B will be referred to as FIG. 3, for convenience.

In step 400, an ANTS selects a packet #i for a particular user, to be transmitted using a multiuser packet. In step 402, the ANTS generates a PacketInfo field and a Length field shown in FIG. 2 or 3 using format information, a receiving AT's ID, and a length for the packet #i. After the packet generation, the ANTS determines in step 404 whether the packet #i having the PacketInfo field and the Length field can be added to a remaining space of a MAC packet. If it is determined in step 404 that the packet #i can be added to the remaining space, the ANTS proceeds to step 406. Otherwise, if the packet #i cannot be added, the ANTS proceeds to step 410 where it determines whether there are any more user packets to add. If there are any packets to add, the ANTS returns to step 400. Otherwise, the ANTS proceeds to step 412.

In step 406, the ANTS adds the PacketInfo field and the Length field of the packet #i to an end of a MAC header of the MAC packet, and adds the packet #i to an end of a MAC payload. After completion of adding the new packet #i in step 406, the ANTS determines in step 408 whether the MAC packet includes a maximum possible number of for example, 8 user packets. If it is determined that the number of user packets included in the MAC packet has not reached the maximum possible number, the ANTS proceeds to step 410 where it determines whether there are any more packets to add.

However, if it is determined in step 408 that the MAC packet includes 8 user packets, i.e., a maximum possible number of user packets, the ANTS stops adding new packets and proceeds to step 412 where it determines whether there is any empty spaces in the MAC packet. If it is determined that there is an empty space in the MAC packet, the ANTS determines in step 414 whether the corresponding MAC packet includes a maximum possible number of, for example, 8 user packets. If it is determined that the MAC packet includes 8 user packets, i.e., a maximum possible number of user packets, the ANTS adds enough '0'-padding to fill up a MAC payload in step 416, and then ends the process. However, if it is determined in step 414 that the MAC packet includes less than 8 user packets, the ANTS adds a NULL PacketInfo field of '00000000' to an end of the MAC header to distinguish between the MAC header and the MAC payload, and adds enough '0'-padding to fill up the empty space of the MAC payload in step 418, completing the generation of the multiuser packet.

Figure 5:
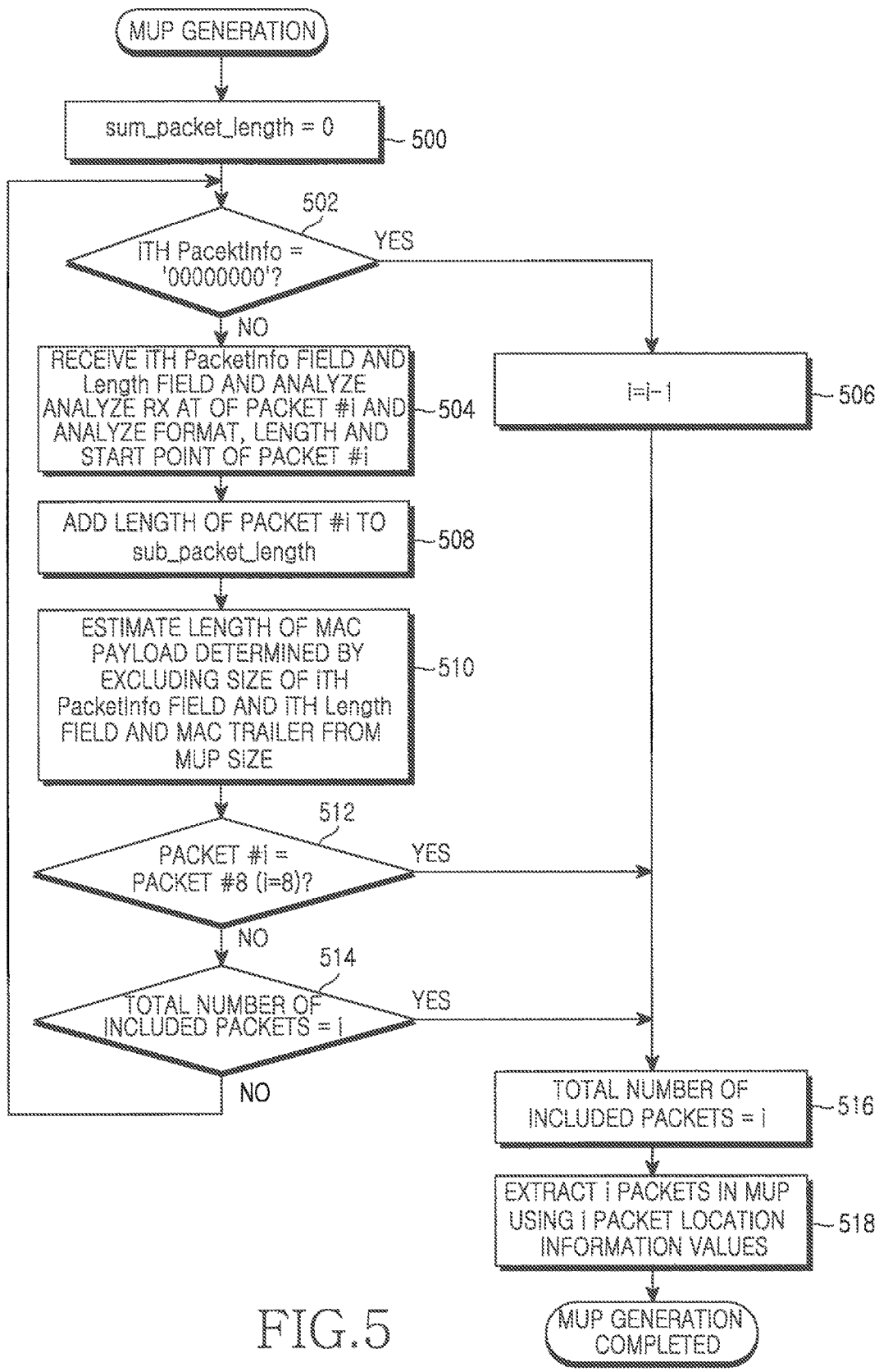
FIG. 5 is a flowchart illustrating a process of analyzing a format of a received multiuser packet by an AT according to the first embodiment of the present invention.

FIG. 5 is a flowchart illustrating a process of analyzing a format of a received multiuser packet by an AT according to the first embodiment of the present invention. With reference to FIG. 5, a detailed description will now be made of a process of analyzing a format of a received multiuser packet by an AT according to the first embodiment of the present invention.

In step 500, an AT receiving a multiuser packet sets a value of a parameter sum_packet_length indicating a sum of lengths of all user packets included in the received multiuser packet, to '0'. In step 502, the AT reads a value of an $i^{th}$ PacketInfo field from the multiuser packet shown in FIG. 2 or 3, and determines whether the read value equals '00000000'. If the read value equals '00000000', the AT can determine that the number of user packets included in the multiuser packet is i−1. In this case, the AT decreases a value of i by one in step 506, and sets the new value of i as the number of user packets included in the multiuser packet in step 516. Thereafter, the AT can extract i packets in the multiuser packet based on information analyzed using i PacketInfo fields and Length fields in step 518.

If it is determined in step 502 that the read value does not equal '00000000', the AT checks format information, a receiving AT's ID, and a length for the $i^{th}$ user packet corresponding to the read $i^{th}$ PacketInfo field and Length field in step 504. Thereafter, in step 508, the AT adds the length of the $i^{th}$ user packet to the parameter sum_packet_length. In step 510, the AT estimates a size of the MAC payload for the case where i user packets are included in the multiuser packet. The estimation can be performed by subtracting lengths of i PacketInfo fields and Length fields and a length (2 bits) of a MAC trailer from the total length of the MAC packet, reported from a physical layer. In step 512, the At determines whether the determined length of the MAC payload is equal in value to the parameter sum_packet_length. If the two values are equal to each other, the AT can determine in step 516 that the number of user packets included in the MAC packet is i. In step 518, the AT can extract i packets in the multiuser packet based on information analyzed. using the i PacketInfo fields and Length fields. However, if it is determined in step 512 that the length of the MAC payload is different in value from the parameter sum_packet_length, the AT determines in step 514 whether a value of i has reached 8 which is the maximum possible number of user packets included in the multiuser packet. If the value of i is equal to 8, the AT can determine the number of user packets included in the MAC packet as 8 in step 516, and extract 8 user packets in the multiuser packet based on information analyzed using the 8 PacketInfo fields and Length fields in step 518.

However, if it is determined in step 514 that the value of i is not equal to 8, the AT returns to step 502 and performs its succeeding steps again to read. information on the next user packet.

Second Embodiment

Figure 6A:
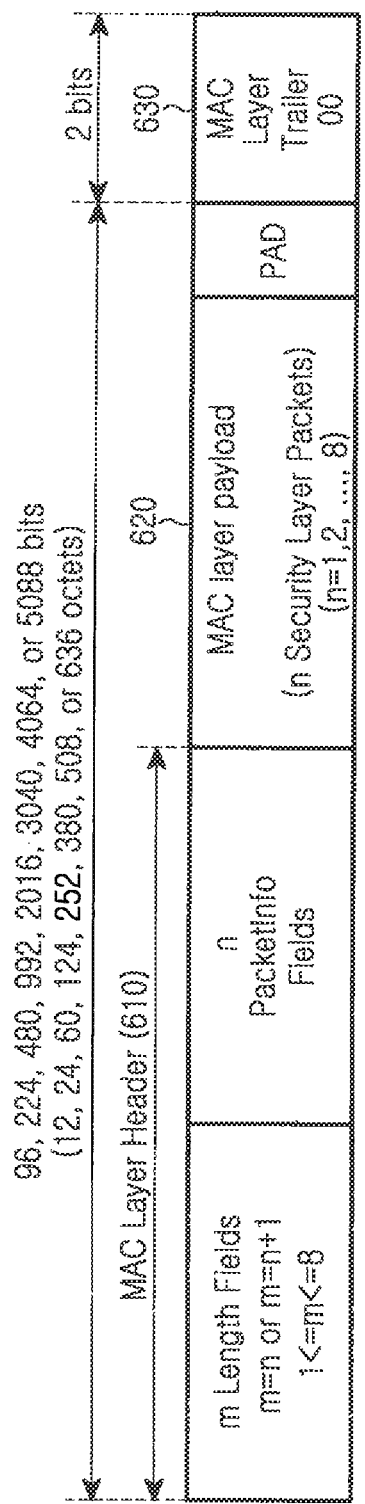
FIG. 6A is a diagram illustrating an exemplary efficient format of a multiuser packet according to a second embodiment of the present invention.

FIG. 6A is a diagram illustrating an exemplary efficient format of a multiuser packet according to a second embodiment of the present invention. With reference to FIG. 6A, a detailed description will now be made of an efficient format of a multiuser packet according to the second embodiment of the present invention.

Substantially as described above, a multi-user packet shown in FIG. 6A can be roughly divided into three parts, comprising:
 (1) MAC header 610,
 (2) MAC payload 620, and
 (3) MAC trailer 630.

Figure 6B:
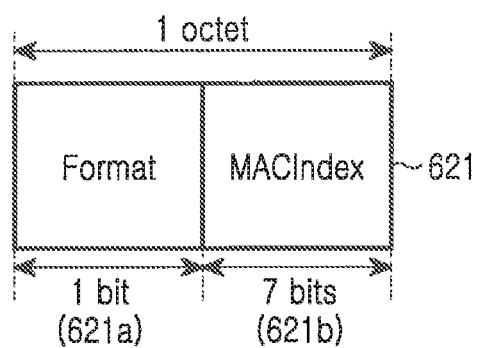
FIG. 6B illustrates an efficient format of a PacketInfo field in a MAC header for a multiuser packet according to the second embodiment of the present invention.

The MAC header 610, a part including information on addresses, lengths and formats of several user packets included in a MAC packet, comprises a minimum of one Length field or a maximum of 8 Length fields, and comprises a minimum of one PacketInfo field or a maximum of 8 PacketInfo fields. Similarly, the number of the PacketInfo fields is extendable. However, the preferred maximum number of the PacketInfo fields becomes 8 when a size of a packet provided in the 1xEVDO system is taken into consideration. Therefore, the minimum number and maximum number of the PacketInfo fields are subject to change for other systems. Referring to FIG. 6B, a PacketInfo field 621 in the MAC header 610 comprises a 1-bit Format field 621a indicating a format of a user packet and a 7-bit MACIndex field 621b indicating an ID of a receiving AT for the user packet. FIG. 6B illustrates an efficient format of a PacketInfo field. constituting a MAC header for a multiuser packet according to the second embodiment of the present invention. The number of the Length fields is greater by one than the number of the PacketInfo fields when the number of user packets included in the MAC packet is less than 8 and a sum of lengths of the user packets is less than a size of the MAC payload 620. For example, in this case, the MAC header 610 may comprise 4 Length fields and 3 PacketInfo fields. The last Length field included in the MAC header 610 has a value of '00000000' to indicate a boundary between the Length fields and the PacketInfo fields.

The MAC payload 620 comprises actual user packets included in the MAC packet. The MAC payload 620 is generated by consecutively connecting packets for multiple users such that a user security layer packet (hereinafter referred to as a "user packet" for simplicity) corresponding to information on an $i^{th}$ PacketInfo field of the MAC header 610 is located in an $i^{th}$ point of the MAC payload 620. Finally, the MAC trailer 630 comprises information indicating a format of the MAC packet, and has a value of '00' for a format of a multiuser packet.

A description will now be made of a process of transmitting a multiuser packet in an ANTS and a process of receiving the multiuser packet in an AT according to the second embodiment of the present invention.

Figure 7:
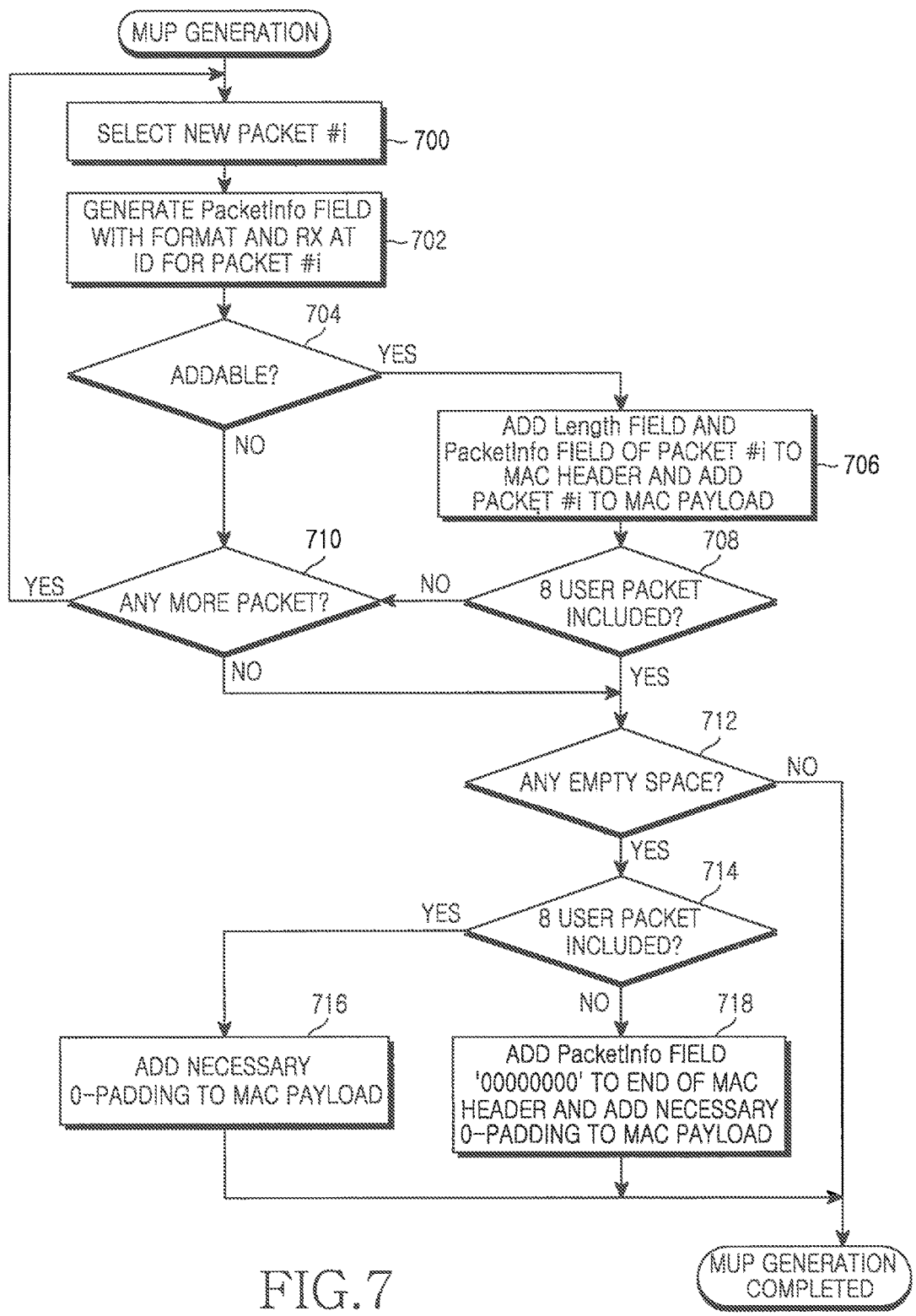
FIG. 7 is a flowchart illustrating a process of generating a multiuser packet in an ANTS according to the second embodiment of the present invention.

FIG. 7 is a flowchart illustrating a process of generating a multiuser packet in an ANTS according to the second embodiment of the present invention. With reference to FIG. 7, a detailed description will now be made of a process of generating a multiuser packet in an ANTS according to the second embodiment of the present invention. In the following description, FIGS. 6A and 6B will be referred to as FIG. 6, for convenience.

In step 700, an ANTS selects a packet #i for a particular user, to be transmitted using a multiuser packet. In step 702, the ANTS generates a PacketInfo field shown in FIG. 6 using format information and a receiving AT's ID for the packet #i. Thereafter, the ANTS determines in step 704 whether the packet #i and a Length field and a PacketInfo field for packet #i can be added to a remaining space of a MAC packet. If it is determined in step 704 that they can be added to the remaining space, the ANTS proceeds to step 706 where it adds the Length field and the PacketInfo field for the packet #i to the last Length field and the last PacketInfo field of the MAC header, respectively, to satisfy the format shown in FIG. 6, and adds the packet #i to an end of a MAC payload. However, if it is determined in step 704 that the packet #i cannot be added to the remaining space, the ANTS proceeds to step 710 where it determines whether there are any more user packets to add.

After completion of adding the new packet #i in step 706, the ANTS determines in step 708 whether the MAC packet includes a maximum possible number of for example, 8 user packets. If it is determined that the number of user packets included in the MAC packet has not reached the maximum possible number, the ANTS proceeds to step 710 where it determines whether there are any more user packets to add. However, if it is determined in step 708 that the MAC packet includes 8 user packets, i.e., a maximum possible number of user packets, the ANTS stops adding new packets and proceeds to step 712 where it determines whether there are any empty spaces in the MAC packet. Also, if it is determined in step 710 that there are no more user packets to add, the ANTS stops adding new packets and proceeds to step 712, where it determines whether there are any empty spaces in the MAC packet.

However, if it is determined in step 710 that there are more user packets to add, the ANTS returns to step 700 and performs its succeeding steps.

If it is determined in step 712 that there is an empty space in the MAC packet, the ANTS determines in step 714 whether the corresponding MAC packet includes a maximum possible number of for example, 8 user packets. If it is determined that the MAC packet includes 8 user packets, i.e., a maximum possible number of user packets, the ANTS adds enough '0'-padding to fill up the MAC payload in step 716, and then ends the process. However, if it is determined in step 714 that the MAC packet includes less than 8 user packets, the ANTS adds a Length field of '00000000' to the last Length field in the MAC header to distinguish between Length fields and PacketInfo fields in the MAC header, and adds enough '0'-padding to fill up the empty space of the MAC payload in step 718, completing generation of the multiuser packet.

Figure 8:
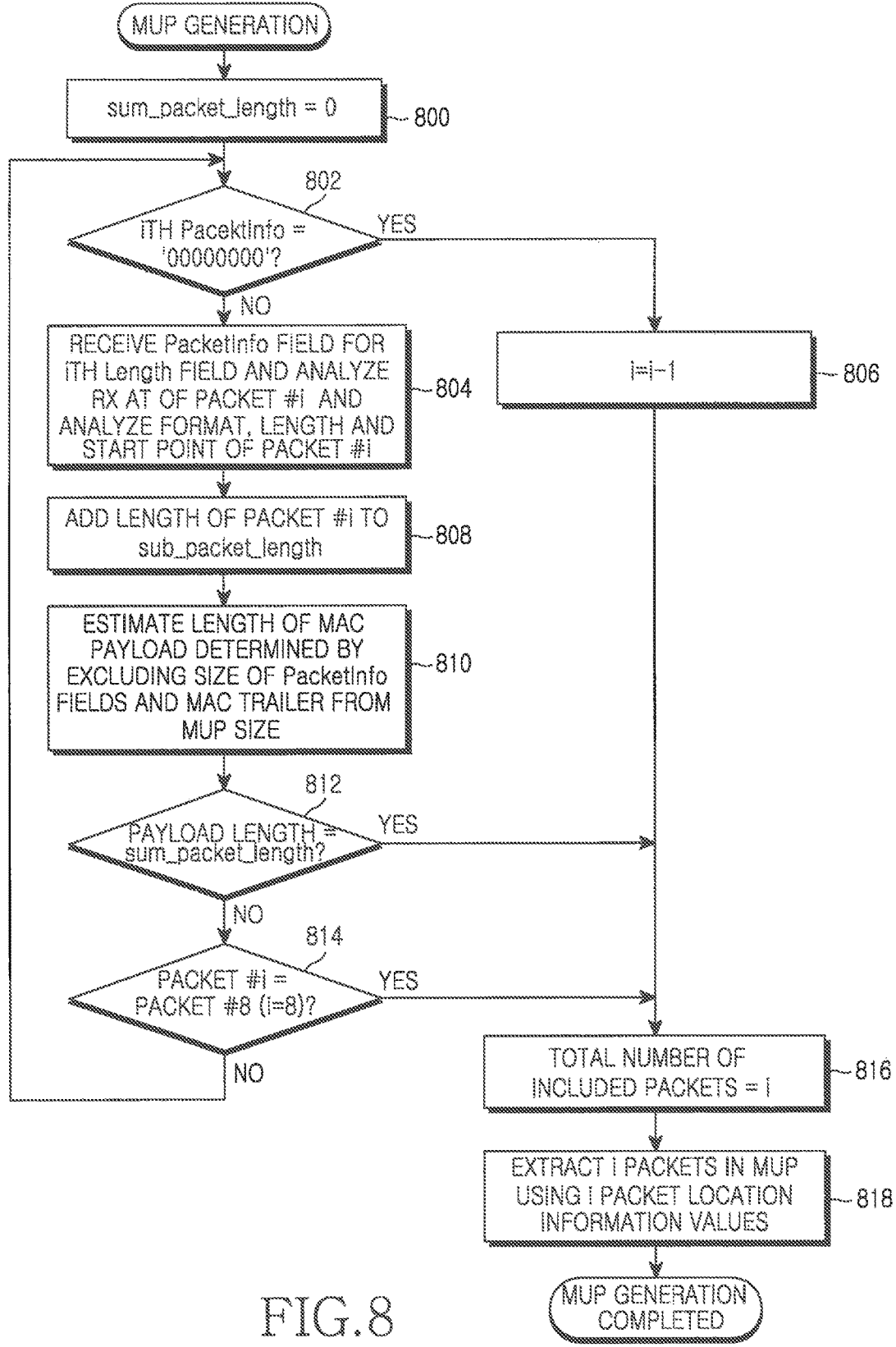
FIG. 8 is a flowchart illustrating a process of analyzing a format of a received multiuser packet by an AT according to the second embodiment of the present invention.

FIG. 8 is a flowchart illustrating a process of analyzing a format of a received multiuser packet by an AT according to the second embodiment of the present invention. With reference to FIG. 8, a detailed description will now be made of a process of analyzing a format of a received multiuser packet by an AT according to the second embodiment of the present invention.

In step 800, an AT receiving a multiuser packet sets a value of a parameter sum_packet_length indicating a sum of lengths of all user packets included in the received multiuser packet, to '0'. In step 802, the AT reads a value of an Length field from the multiuser packet shown in FIG. 6, and determines whether the read value equals '00000000'. If the read value equals '00000000', the AT can determine that the number of user packets included in the multiuser packet is i−1. In this case, the AT decreases a value of i by one in step 806, and sets the new value of i as the number of user packets included in the multiuser packet in step 816. Thereafter, the AT can extract i packets in the multiuser packet based on information analyzed using i Length fields and PacketInfo fields in step 818.

However, if it is determined in step 802 that the read value does not equal '00000000', the AT checks format information and a receiving AT's ID for the $i^{th}$ user packet corresponding to a read $i^{th}$ PacketInfo field for the read Length field in step 804. Thereafter, in step 808, the AT adds the length of the $i^{th}$ user packet to the parameter sum_packet_length. In step 810, the AT estimates a size of the MAC payload for the case where i user packets are included in the multiuser packet. The estimation can be performed by subtracting lengths of i Length fields and PacketInfo fields and a length (2 bits) of a MAC trailer from the total length of the MAC packet, reported from a physical layer. In step 812, the AT determines whether the determined length of the MAC payload is equal in value to the parameter sum packet length. If the two values are equal to each other, the AT can determine in step 816 that the number of user packets included in the MAC packet is i. In this case, the AT can extract i packets in the multiuser packet based on information analyzed using the i Length fields and PacketInfo fields, in step 818.

However, if it is determined in step 812 that the length of the MAC payload is different in value from the parameter sum_packet_length, the AT determines in step 814 whether a value of i has reached 8 which is the maximum possible number of user packets included in the multiuser packet. If the value of i is equal to 8, the AT can determine the number of user packets included in the MAC packet as 8 in step 816, and extract 8 user packets in the multiuser packet based on information analyzed. using the 8 Length fields and PacketInfo fields in step 818.

However, if it is determined in step 814 that the value of i is not equal to 8, the AT returns to step 802 and performs its succeeding steps again to read. information on the next user packet.

Third Embodiment

Figure 9A:
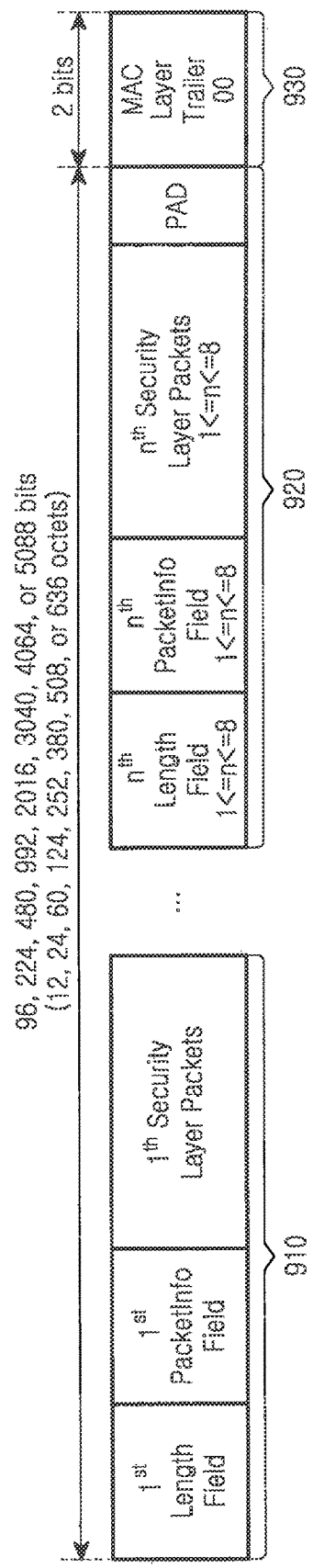
FIG. 9A is a diagram illustrating an exemplary efficient format of a multiuser packet according to a third embodiment of the present invention.

FIG. 9A is a diagram illustrating an exemplary efficient format of a multiuser packet according to a third embodiment of the present invention. With reference to FIG. 9A, a detailed description will now be made of an efficient format of a multiuser packet according to the third embodiment of the present invention.

Substantially as described above, a multi-user packet shown in FIG. 9A can be roughly divided into three parts, comprising:
(1) MAC header 910,
(2) MAC payload 920, and
(3) MAC trailer 930.

Each of n MAC headers 910 is a part including information on addresses, lengths and formats of several user packets included in a MAC packet. Each of the n MAC headers 910 can comprise a minimum of one Length field or a maximum of 8 Length fields, and a minimum of one PacketInfo field or a maximum of 8 PacketInfo fields. Similarly, the possible number of the PacketInfo fields included in the MAC packet is extendable. However, the preferred maximum number of the PacketInfo fields becomes 8 when a size of a packet provided in the 1xEVDO system is taken into consideration. Therefore, the minimum number and maximum number of the PacketInfo fields are subject to change for other systems.

Figure 9B:
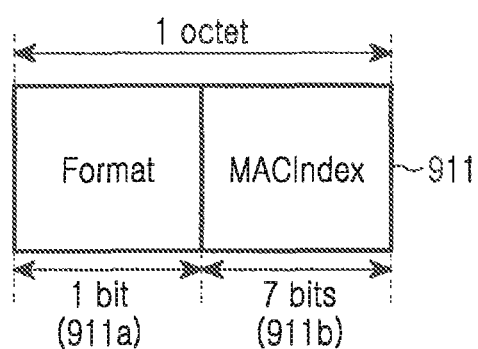
FIG. 9B is a diagram illustrating a format of a PacketInfo field in a MAC header for a multiuser packet according to the third embodiment of the present invention.

Referring to FIG. 9B, a PacketInfo field 911 in the MAC header 910 comprises a 1-bit Format field 911a indicating a format of a user packet and a 7-bit MACIndex field 911b indicating an ID of a receiving AT for the user packet. Each of the n MAC payloads 920 comprises actual user packets included in the MAC packet. The MAC payload 920 transmits a user security layer packet (hereinafter referred to as a "user packet" for simplicity) corresponding to information on a PacketInfo field of its preceding MAC header. The MAC trailer 930 comprises information indicating a format of the MAC packet, and has a value of '00' for a format of a multiuser packet.

Figure 10:
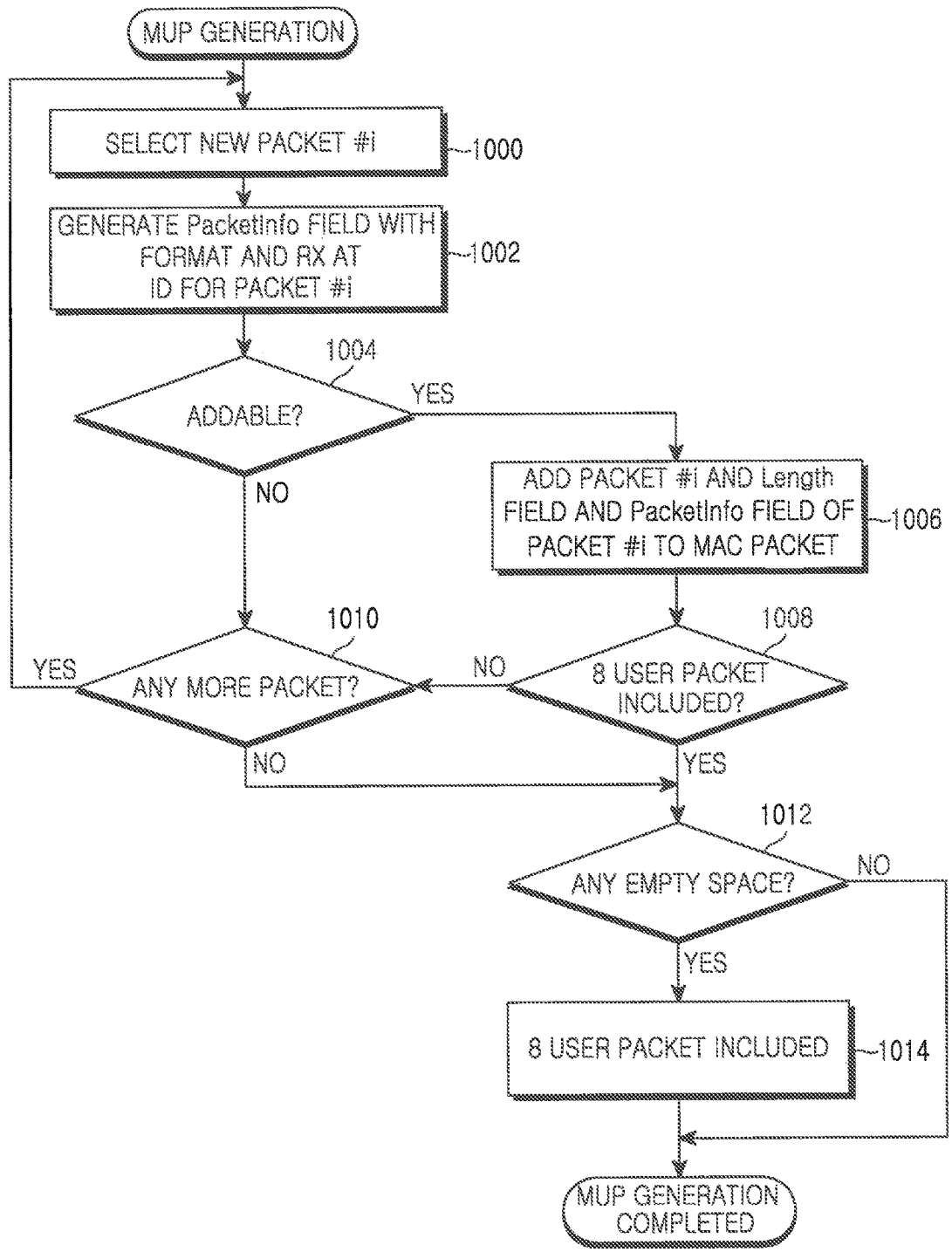
FIG. 10 is a flowchart illustrating a process of generating a multiuser packet in an ANTS according to the third embodiment of the present invention.

FIG. 10 is a flowchart illustrating a process of generating a multiuser packet in an ANTS according to the third embodiment of the present invention. With reference to FIG. 10, a detailed description will now be made of a process of generating a multiuser packet in an ANTS according to the third embodiment of the present invention. In the following description, FIGS. 9A and 9B will be referred to as FIG. 9, for convenience.

In step 1000, an ANTS selects a packet #i for a particular user, to be transmitted using a multiuser packet. In step 1002, the ANTS generates a PacketInfo field shown in FIG. 9 using format information and a receiving AT's ID for the packet #i. Thereafter, the ANTS determines in step 1004 whether the packet #i and a Length field and a PacketInfo field for packet #i can be added to a remaining space of a MAC packet. If it is determined in step 1004 that they can be added to the remaining space, the ANTS proceeds to step 1006 where it adds the packet #i and the Length field and the PacketInfo field for the packet #i to the last added user packet and the last Length field and the last PacketInfo field for the user packet, respectively, to satisfy the format shown in FIG. 9.

However, if it is determined in step 1004 that the packet #i cannot be added to the remaining space, the ANTS proceeds to step 1010 where it determines whether there are any more user packets to add. If there are more user packets to add, the ANTS returns to step 1000 and repeatedly performs its succeeding steps. However, if there are no more user packets to add, the ANTS proceeds to step 1012.

After completion of adding the new packet #i in step 1006, the ANTS determines in step 1008 whether the MAC packet includes a maximum possible number of, for example, 8 user packets. If it is determined that the number of user packets included in the MAC packet has not reached the maximum possible number, the ANTS proceeds to step 1010 where it determines whether there are any more user packets to add.

However, if it is determined in step 1008 that the MAC packet includes 8 user packets, i.e., a maximum possible number of user packets, the ANTS stops adding new packets and proceeds to step 1012 where it determines whether there are any empty spaces in the MAC packet. If it is determined that there is an empty space in the MAC packet, the ANTS adds enough '0'-padding to fill up the MAC payload in step 1014, and then ends the process. However, if there is no empty space in the MAC packet, the ANTS ends the process without '0'-padding.

Figure 11:
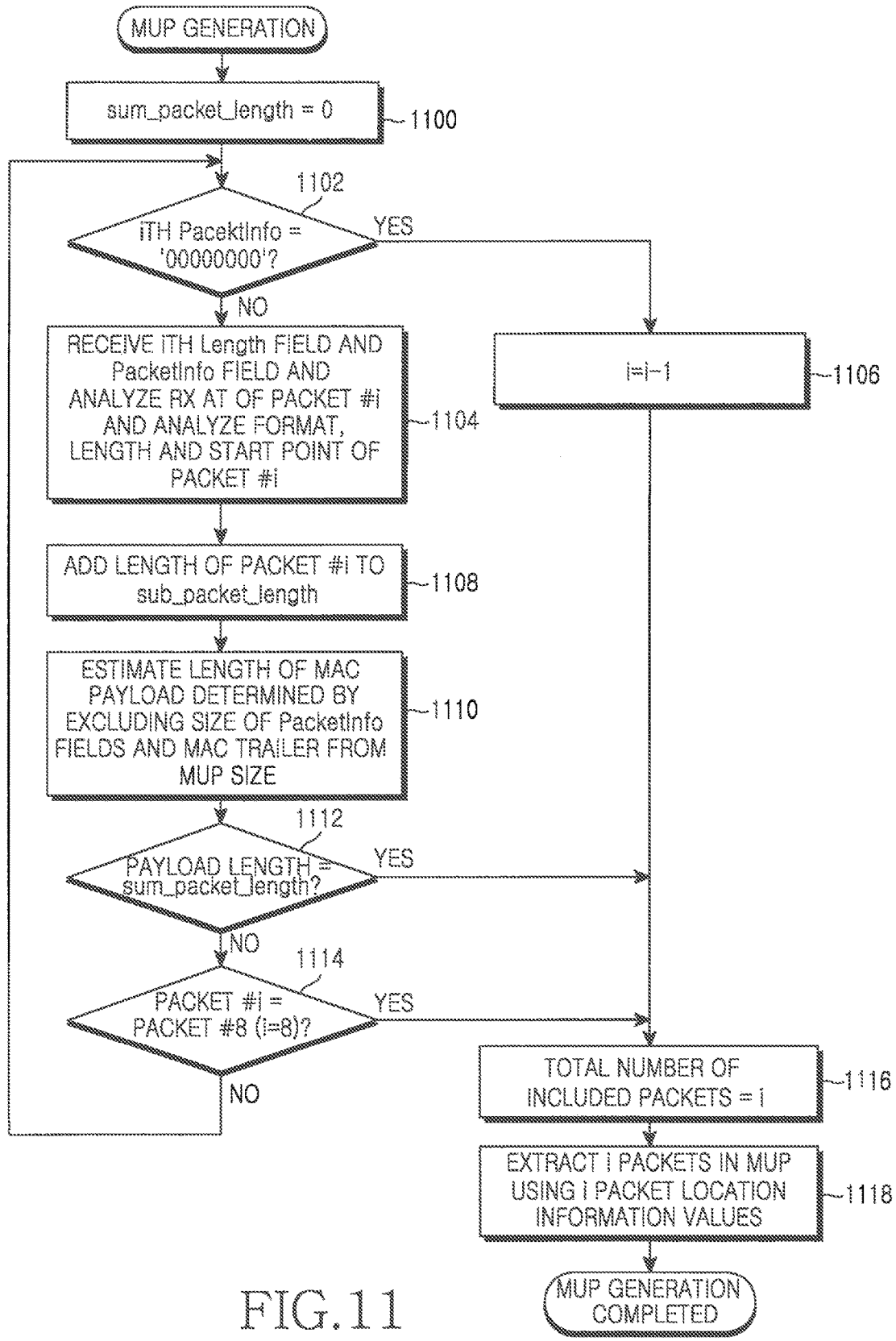
FIG. 11 is a flowchart illustrating a process of analyzing a format of a received multiuser packet by an AT according to the third embodiment of the present invention.

FIG. 11 is a flowchart illustrating a process of analyzing a format of a received multiuser packet by an AT according to the third embodiment of the present invention. With reference to FIG. 11, a detailed description will now be made of a process of analyzing a format of a received multiuser packet by an AT according to the third embodiment of the present invention.

In step 1100, an AT receiving a multiuser packet sets a value of a parameter sum_packet_length indicating a sum of lengths of all user packets included in the received multiuser packet, to '0'. In step 1102, the AT reads a value of an Length field from the multiuser packet shown in FIG. 9, and determines whether the read value equals '00000000'. In the third embodiment of the present invention, because a value of the Length field cannot become '00000000', the AT can determine that the read value of '00000000' is a start of a padding part. Therefore, the AT can determine that the number of user packets included in the multiuser packet is i−1. In this case, the AT decreases a value of i by one in step 1106, and sets the new value of i as the number of user packets included in the multiuser packet in step 1116. Thereafter, the AT can extract i packets in the multiuser packet based on information analyzed using i Length fields and PacketInfo fields in step 1118.

However, if it is determined in step 1102 that the read value does not equal '00000000', the AT checks format information and a receiving AT's ID for the $i^{th}$ user packet corresponding to a read $i^{th}$ PacketInfo field for the read $i^{th}$ Length field in step 1104. Thereafter, in step 1108, the AT adds the length of the $i^{th}$ user packet to the parameter sum_packet_length. In step 1110, the AT estimates a size of the MAC payload for the case where i user packets are included in the multiuser packet. The estimation can be performed by subtracting lengths of i Length fields and PacketInfo fields and a length (2 bits) of a MAC trailer from the total length of the MAC packet, reported from a physical layer. In step 1112, the AT determines whether the determined length of the MAC payload is equal in value to the parameter sum_packet_length. If the two values are equal to each other, the AT performs step 1116 and its succeeding step in the manner described above.

However, if it is determined in step 1112 that the length of the MAC payload is different in value from the parameter sum_packet_length, the AT determines in step 1114 whether a value of i has reached 8 which is the maximum possible number of user packets included in the multiuser packet. If the value of i is equal to 8, the AT proceeds to step 1116. Otherwise, if the value of i is not equal to 8, the AT returns to step 1102 and performs its succeeding steps again to read information on the next user packet.

Figure 12:
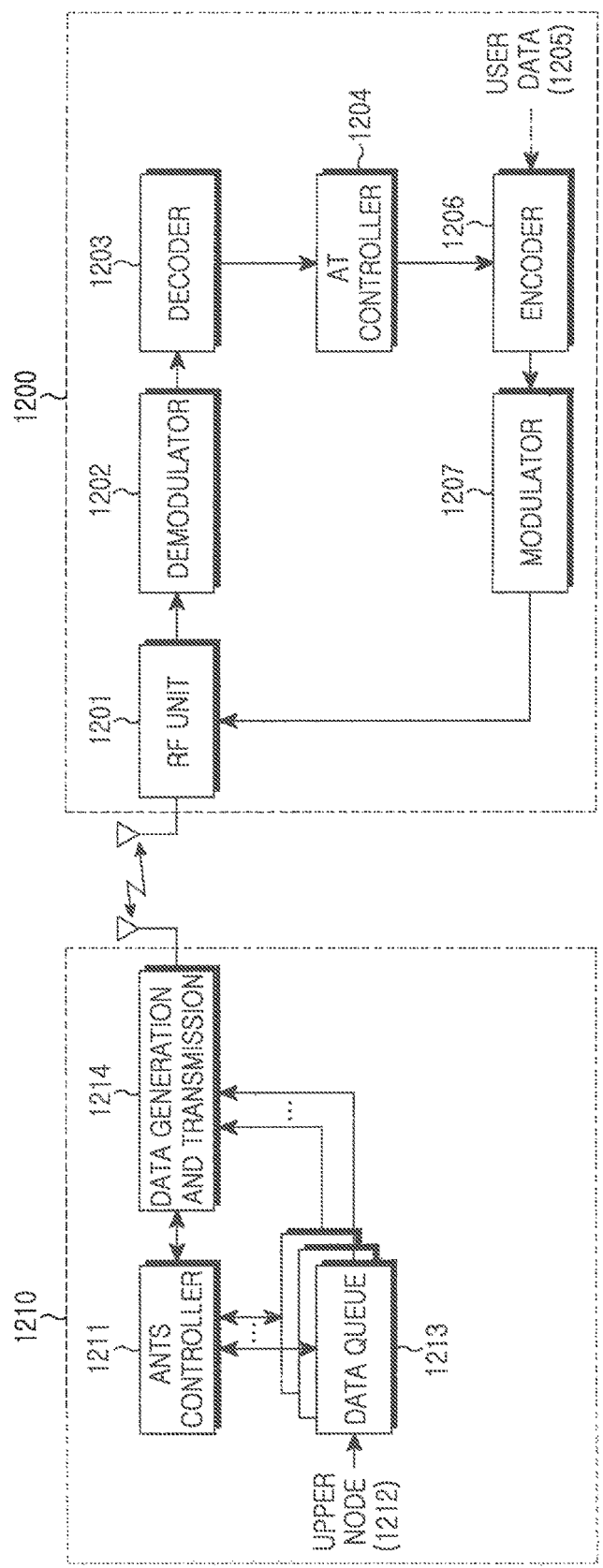
FIG. 12 is a block diagram illustrating structures of an ANTS and an AT according to an exemplary embodiment of the present invention.

A description will now be made of structures of an ANTS and an. AT according to an exemplary embodiment of the present invention., FIG. 12 is a block diagram illustrating structures of an ANTS and an AT according to an exemplary embodiment of the present invention. With reference to FIG. 12, a detailed description will now be made of structures of an ANTS and an AT according to an embodiment of the present invention.

Figure 1:
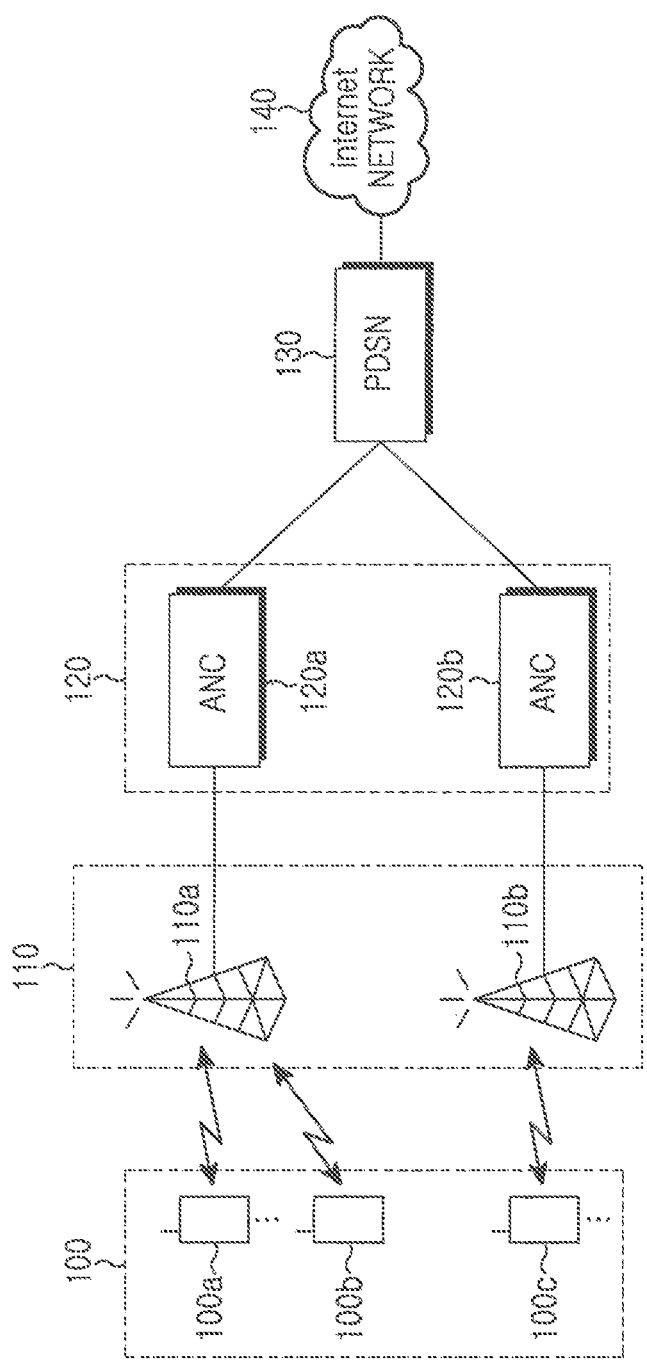
FIG. 1 is a conceptual diagram illustrating an exemplary 1xEVDO mobile communication system.

A structure and operation of an ANTS 1210 will first be described herein below. The ANTS 1210 corresponds to the ANTS 110 shown in FIG. 1, but is not limited thereto. An ANTS controller 1211 controls a process of generating a multiuser packet with a format shown in FIGS. 2, 3, 6 and 9. A data queue 1213 stores user data received from an upper node 1212 separately for individual users. For example, the upper node 1212 corresponds to the ANC 120 of FIG. 1. The ANTS controller 1211 detects the data stored in the data queue 1213, and performs a control operation of generating and transmitting a multiuser packet according to characteristics of the data before transmission.

That is, the ANTS controller 1211 controls transmission of the data stored in the data queue 1213. When transmitting a single user packet, the ANTS controller 1211 outputs data stored in only one data queue to a data generation and transmission/reception unit 1214. However, when transmitting a multiuser packet, the ANTS controller 1211 reads data from a plurality of data queues 1213 and outputs the read data to the data generation and transmission/reception unit 1214 in order to generate a multiuser packet with a format shown in FIGS. 2, 3, 6 and 9 using user data stored in the plurality of data queues 1213 before transmission. Then the data generation and transmission/reception unit 1214 generates a transmission burst under the control of the ANTS controller 1211, and transmits the transmission burst through a corresponding wireless band.

Next, a structure and operation of an AT 1200 will be described. The AT 1200 corresponds to the AT 100 of FIG. 1, but is not limited thereto. In the AT 1200, a radio frequency (RF) unit 1201 frequency-down-converts an RF signal received from an antenna into a baseband signal, and outputs the baseband signal to a demodulator 1202. The demodulator 1202 demodulates the baseband signal modulated during its transmission, and outputs the demodulated data to a decoder 1203. The decoder 1203 decodes the demodulated data encoded during its transmission, and outputs the decoded data to an AT controller 1204 together with a CRC error check result. The RF unit 1201, the demodulator 1202 and the decoder 1203 comprise a reception data processor.

The AT controller 1204 controls the operations of FIGS. 5, 8 and 11, using the data received at the reception data processor. That is, for a multiuser packet, the AT controller 1204 performs a control operation of processing its own multiuser packet transmitted thereto. Description of other control operations performed by the AT controller 1204 will be omitted for clarity and conciseness.

In addition, the AT controller 1204 generates a control signal to be transmitted in the reverse direction, and provides the generated control signal to an encoder 1206. The encoder 1206 encodes the user data and the control signal, and outputs the encoded data to a modulator 1207. The modulator 1207 performs modulation with a modulation method selected according to the characteristics of the data, and outputs the modulated data to the RF unit 1201. The RF unit 1201 frequency-up-converts the data received from the modulator 1207 into an RF signal, and reverse-transmits the RF signal to the ANTS 1210 via an antenna. The encoder 1206, the modulator 1207 and the RF unit 1201 comprise a transmission data processor.

The RF unit 1201 can be included in both the reception data processor and the transmission data processor. The RF unit 1201 may further include a. reception unit for the reception data processor and a transmission unit for the transmission data processor.

As can be understood from the foregoing description, the novel apparatus and method of embodiments of the present invention can efficiently transmit information included in a packet to each of multiple users other than a single user.

While exemplary embodiments of the invention have been shown and described with reference to a certain exemplary implementations thereof, it will be understood by those skilled in the art that various changes in form and details may be made therein without departing from the spirit and scope of the invention as defined by the appended claims.

What is claimed is:

1. A method for transmitting a medium access control (MAC) packet in a mobile communication system, the method comprising:
    generating a MAC packet comprising a MAC header and a MAC payload; and
    transmitting the MAC packet to a plurality of terminals on a channel,
    wherein the MAC header is a variable size, and comprises at least n first info fields and one second info field,
    wherein each of n first info fields includes an identifier field associated with one of the plurality of terminals, where n is a natural number, and the one second info field does not include the identifier field and is placed on one edge within the MAC header,
    wherein the MAC header is octet aligned and each of the n first info fields is one octet,
    wherein the MAC payload comprises n packets, an i-th packet corresponds to a i-th first info field among the n first info fields, where i is one value of 1, 2, . . . , n, and
    wherein a padding is located after the n-th packet optionally and a length of the padding is based on the variable size of the MAC header and a number of the packets.

2. The method of claim 1, wherein the each of the n first info fields further comprises a transmission format.

3. A method for receiving a medium access control (MAC) packet in a mobile communication system, the method comprising:
    receiving, by a mobile terminal, a MAC packet comprising a MAC header and a MAC payload on a channel from an access network transceiver,
    wherein the MAC header is a variable size, and comprises at least n first info fields and one second info field,
    wherein each of n first info fields includes an identifier field associated with one of the plurality of terminals, where n is a natural number, and the one second info field does not include the identifier field and is placed on one edge within the MAC header,
    wherein the MAC header is octet aligned and each of the n first info fields is one octet,
    wherein the MAC payload comprises n packets, an i-th packet corresponds to a i-th first info field among the n first info fields, where i is one value of 1, 2, . . . , n, and
    wherein a padding is located after the n-th packet optionally and a length of the padding is based on the variable size of the MAC header and a number of the packets.

4. The method of claim 3, wherein the each of the n first info fields further comprises a transmission format.

5. An apparatus for transmitting a medium access control (MAC) packet in a mobile communication system, the apparatus comprising:

a processor configured to generate a MAC packet comprising a MAC header and a MAC payload, and transmit the MAC packet to a plurality of terminals on a channel,
wherein the MAC header is a variable size, and comprises at least n first info fields and one second info field,
wherein each of n first info fields includes an identifier field associated with one of the plurality of terminals, where n is a natural number, and the one second info field does not include the identifier field and is placed on one edge within the MAC header,
wherein the MAC header is octet aligned and each of the n first info fields is one octet,
wherein the MAC payload comprises n packets, an i-th packet corresponds to an i-th first info field among the n first info fields, where i is one value of 1, 2, . . . , n, and
wherein a padding is located after the n-th packet optionally and a length of the padding is based on the variable size of the MAC header and a number of the packets.

6. The apparatus of claim 5, wherein the each of the n first info fields further comprises a transmission format.

7. An apparatus for receiving a medium access control (MAC) packet in a mobile communication system, the apparatus comprising:
a processor configured to receive a MAC packet comprising a MAC header and a MAC payload on a channel from an access network transceiver,
wherein the MAC header is a variable size, and comprises at least n first info fields and one second info field,
wherein each of n first info fields includes an identifier field associated with one of the plurality of terminals, where n is a natural number, and the one second info field does not include the identifier field and is placed on one edge within the MAC header,
wherein the MAC header is octet aligned and each of the n first info fields is one octet,
wherein the MAC payload comprises n packets, an i-th packet corresponds to a i-th first info field among the n first info fields, where i is one value of 1, 2, . . . , n, and
wherein a padding is located after the n-th packet optionally and a length of the padding is based on the variable size of the MAC header and a number of the packets.

8. The apparatus of claim 7, wherein the each of the n first info fields further comprises a transmission format.

* * * * *